(12) United States Patent
Choi

(10) Patent No.: US 6,342,958 B1
(45) Date of Patent: Jan. 29, 2002

(54) WAVELENGTH DIVISION MULTIPLEXED TRANSMISSION SYSTEM AND TRANSMITTING METHOD USING THE SAME

(75) Inventor: Doe-in Choi, Seoul (KR)

(73) Assignee: Samsung Electronics Co., Ltd, Suwon (KR)

( * ) Notice: Subject to any disclaimer, the term of this patent is extended or adjusted under 35 U.S.C. 154(b) by 0 days.

(21) Appl. No.: 09/161,529

(22) Filed: Sep. 28, 1998

(30) Foreign Application Priority Data

Sep. 26, 1997 (KR) ............................................. 97-49091

(51) Int. Cl.[7] ............................................. H04B 10/08
(52) U.S. Cl. ........................ 359/110; 359/140; 359/161; 359/337; 359/349; 359/179; 359/123
(58) Field of Search ................................. 359/110, 140, 359/161, 337, 349, 124–134, 174–179, 123

(56) References Cited

U.S. PATENT DOCUMENTS

| | | | | |
|---|---|---|---|---|
| 5,339,183 A | * | 8/1994 | Suzuki | 359/123 |
| 5,500,756 A | * | 3/1996 | Tsushima et al. | 359/174 |
| 5,502,810 A | | 3/1996 | Watanabe | |
| 5,636,045 A | * | 6/1997 | Okayama et al. | 359/140 |
| 5,703,708 A | * | 12/1997 | Das et al. | 359/140 |
| 6,023,366 A | * | 2/2000 | Kinoshita | 359/341 |

FOREIGN PATENT DOCUMENTS

| | | |
|---|---|---|
| JP | 61-166241 | 7/1986 |
| JP | 10-22979 | 1/1989 |
| JP | 8-95097 | 4/1996 |
| JP | 9-116506 | 5/1997 |
| JP | 9-321701 | 12/1997 |
| JP | 10-51397 | 2/1998 |
| JP | 10-112686 | 4/1998 |

* cited by examiner

Primary Examiner—Leslie Pascal
Assistant Examiner—Hanh Phan
(74) Attorney, Agent, or Firm—Robert E. Bushnell, Esq.

(57) ABSTRACT

A wavelength division multiplexed transmission system and a transmitting method using the same are provided. The wavelength division multiplexed transmission system includes a transmitting optical terminal station for transmitting a supervision channel, delaying a plurality of data channels by a predetermined time, and transmitting the delayed data channels, a plurality of wavelength division multiplexed optical amplifying portions for controlling amplification gain according to gain information included in the supervision channel and amplifying the delayed and incident data channels according to the controlled gain, and a receiving optical terminal station for receiving the supervision channel and the data channels output from the wavelength division multiplexed optical amplifying portion. According to the present invention, it is possible to prevent loss of data due to an imbalance in the gain during optical transmission processes since the optical amplification is performed in a state in which the gain control is completed before the data channels are input by letting the data channels corresponding to the current supervision channel continuously perform delay by a certain time which can be set before starting a service.

13 Claims, 4 Drawing Sheets

WAVELENGTH DIVISION MULTIPLEXED TRANSMISSION SYSTEM AND TRANSMITTING METHOD USING THE SAME

CLAIM OF PRIORITY

This application makes reference to, incorporates the same herein, and claims all benefits accruing under 35 U.S.C §119 from an application entitled Wavelength Division Multiplexed Transmission System And Transmitting Method Using The Same earlier filed in the Korean Industrial Property Office on Sep. 26, 1997, and there duly assigned Ser. No. 97-49091 by that Office.

BACKGROUND OF THE INVENTION

1. Field of the Invention

The present invention relates to a wavelength division multiplexed transmission system and a transmitting method using the same, and more particularly, to a wavelength division multiplexed transmission system in which amplification is performed after amplification gain is controlled and a transmitting method using the same.

2. Description of the Related Art

With development of the erbium doped fiber amplifier since the early 1990's which is an optical amplifier, there has been remarkable development in the field of optical transmission. The erbium doped fiber amplifier periodically amplifies a weakened optical signal in order to complement the attenuation of an optical signal due to a long distance transmission when a large amount of data is transmitted over a long distance through a strand of optical fiber. Therefore, since light is directly amplified, the amplification effect is excellent, unlike in a method of converting light into an electrical signal and amplifying the electrical signal, converting the amplified electrical signal into light and transmitting the light. Accordingly, it is economical. An optical signal is amplified by a pumping light. When the pumping light is injected into the erbium doped fiber amplifier, a doped ion such as erbium in the ground state in the optical fiber is excited by the pumping light. The optical signal is amplified by stimulated emission of the excited erbium.

In a wavelength division multiplexed transmission system, various optical signals having different wavelengths are transmitted through an optical fiber. Accordingly, it is possible to efficiently utilize the low loss characteristic of the optical fiber over a broad wavelength band.

As wavelength division multiplexed systems have been developed so that 4 to 16 channels, as well as a single channel, can be transmitted simultaneously, a wavelength division multiplexed erbium doped fiber amplifier (WDM-EDFA) has been developed for this purpose.

In general, in the WDM-EDFA, long distance communications can be performed only when the amplification gain is maintained to be flat in the respective wavelengths with respect to not less than four channels, unlike a single channel. However, even in the gain-flattened WDM-EDFA, a phenomenon may occur in which the gain fails to be flat due to adding or dropping of the respective multiplexed channels or in which the gain of a channel becomes too large or small.

In the methods which have been provided up to now, only the gain flattening of a used wavelength region is considered. However, in these methods, time taken to control the gain according to channel change is not considered in the WDM-EDFA when the multiple channels are added or dropped. Namely, time taken must be considered to obtain a desired output by reading channel information included in a supervision channel, processing the channel information, and controlling the bias current of a pumping light source so as to obtain the most appropriate gain, for the gain flattening of the multi-channels. When the time is not considered, it is useless to control gain since the data channels already pass through the WDM-EDFA before the gain is controlled. Also, though the channel information is sent using a supervision channel, the result is the same if the data channels and the supervision channel are simultaneously transmitted without considering the time taken to control the gain.

SUMMARY OF THE INVENTION

To solve the above problem, it is an object of the present invention to provide a wavelength division multiplexed transmission system for solving the instability of amplification according to a difference between amplification gain control time and data channel amplification time in a wavelength division multiplexed erbium doped fiber amplifier (WDM-EDFA) by transmitting the add or drop information of data channels using a supervision channel during an electrical signal processing process before the data channels are multiplexed in an optical terminal station, by delaying the data channels by time for which the supervision channel is delayed on a transmission line, and by transmitting the delayed data channels.

It is another object of the present invention to provide a transmitting method using the same.

Accordingly, to achieve the first object, there is provided a wavelength division multiplexed optical transmission system, comprising a transmitting optical terminal station for transmitting a supervision channel, delaying a plurality of data channels by a predetermined time, and transmitting the delayed data channels, a plurality of wavelength division multiplexed optical amplifying portions for controlling amplification gain according to gain information included in the supervision channel and amplifying the delayed and incident data channels according to the controlled gain, and a receiving optical terminal station for receiving the supervision channel and the data channels output from the wavelength division multiplexed optical amplifying portion.

To achieve the second object, there is provided a method for multiplexing and transmitting a plurality of data channels and a supervision channel using transmitting and receiving optical transmission terminal stations and a wavelength division multiplexed optical amplifying portion positioned on a transmission line between the transmitting and receiving optical terminal stations, comprising the steps of measuring a time difference between the data channels and the supervision channel using a predetermined test signal, constructing a supervision channel by sensing a change in the respective data channels, determining the gain of the wavelength division multiplexed amplifying portion by the transmitting terminal station, and transmitting the supervision channel, controlling the gain of the wavelength division multiplexed amplifying portion according to the amplification gain information included in the supervision channel, delaying the data channels by the time difference by the transmitting optical terminal station and transmitting the delayed data channels to the wavelength division multiplexed optical amplifying portion, and amplifying and transmitting the data channels according to the gain controlled by the wavelength division multiplexed amplifying portion.

BRIEF DESCRIPTION OF THE DRAWING(S)

A more complete appreciation of the present invention, and many of the attendant advantages thereof, will become readily apparent as the same becomes better understood by reference to the following detailed description when considered in conjunction with the accompanying drawings, wherein.

DESCRIPTION OF THE PREFERRED EMBODIMENTS

Figure 1:
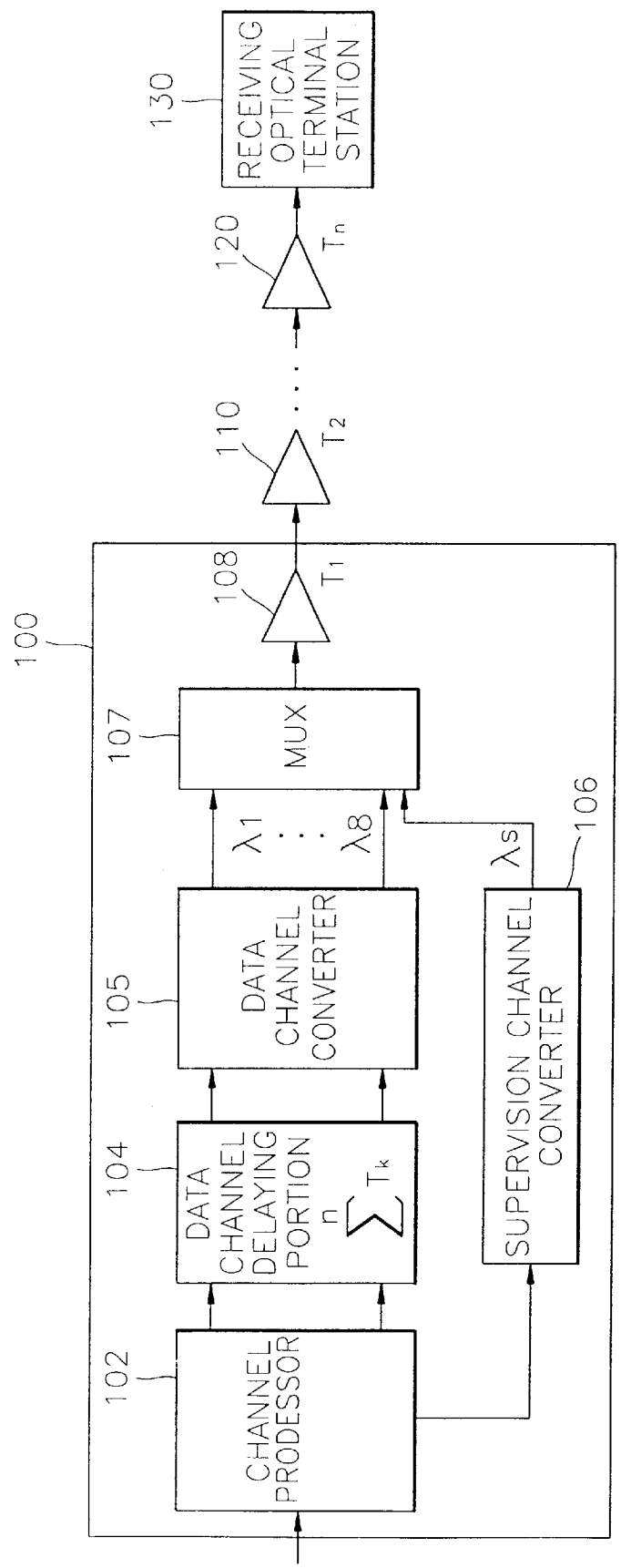
FIG. 1 is a block diagram of a wavelength division multiplexed transmission system according to the present invention.

Hereinafter, the present invention will be described in detail with reference to the attached drawings. FIG. 1 is a block diagram of a wavelength division multiplexed transmission system according to the present invention. The transmission system of FIG. I includes a transmitting optical terminal station 100, a first wavelength division multiplexed erbium doped fiber amplifier (WDM-EDFA) 110, a second WDM-EDFA 120, and a receiving optical terminal station 130. In the transmission system shown in FIG. 1, there are 8 data channels.

The transmitting optical terminal station 100 senses the add and drop states of a plurality of data channels, determines the amplification gain of the respective WDM-EDFAs 110 and 120 between the transmitting optical terminal station 100 and the receiving optical terminal station 130, and constructs a supervision channel. Also, the transmitting optical terminal station 100 delays the data channels by the time taken for the respective WDM-EDFAs 110 AND 120 to interpret and process supervision channel information. The respective WDM-EDFAs 110 and 120 amplify the data channels according to amplification gain information included in the supervision channel. The receiving optical terminal station 130 processes a test signal received from the transmitting optical terminal station 100 and an optical signal received through the second WDM-EDFA 120.

The transmitting optical terminal station 100 includes a channel processor 102, a data channel delaying portion 104, a data channel converter 105, a supervision channel converter 106, a multiplexer 107, and a transmission WDM-EDFA 108.

The channel processor 102 separates the supervision channel and the data channels from a signal converted into an electrical signal, checks the adding and dropping of data channels, determines the amplification gain of the respective WDM-EDFAs on a transmission line, and constructs the supervision channel. The data channel delaying portion 104 delays the data channels by the time taken for the respective WDM-EDFAs on the transmission line to process the supervision channel data. The data channel converter 105 converts the data channels into the optical signal. The supervision channel converter 106 converts the supervision channel into the optical signal. The multiplexer (MUX) 107 multiplexes the output of the data channel converter 105 and the output of the supervision channel converter 106. The transmission WDM-EDFA 108 amplifies the data channels according to the amplification gain information included in the supervision channel and transmits the amplified data channels.

Figure 2:
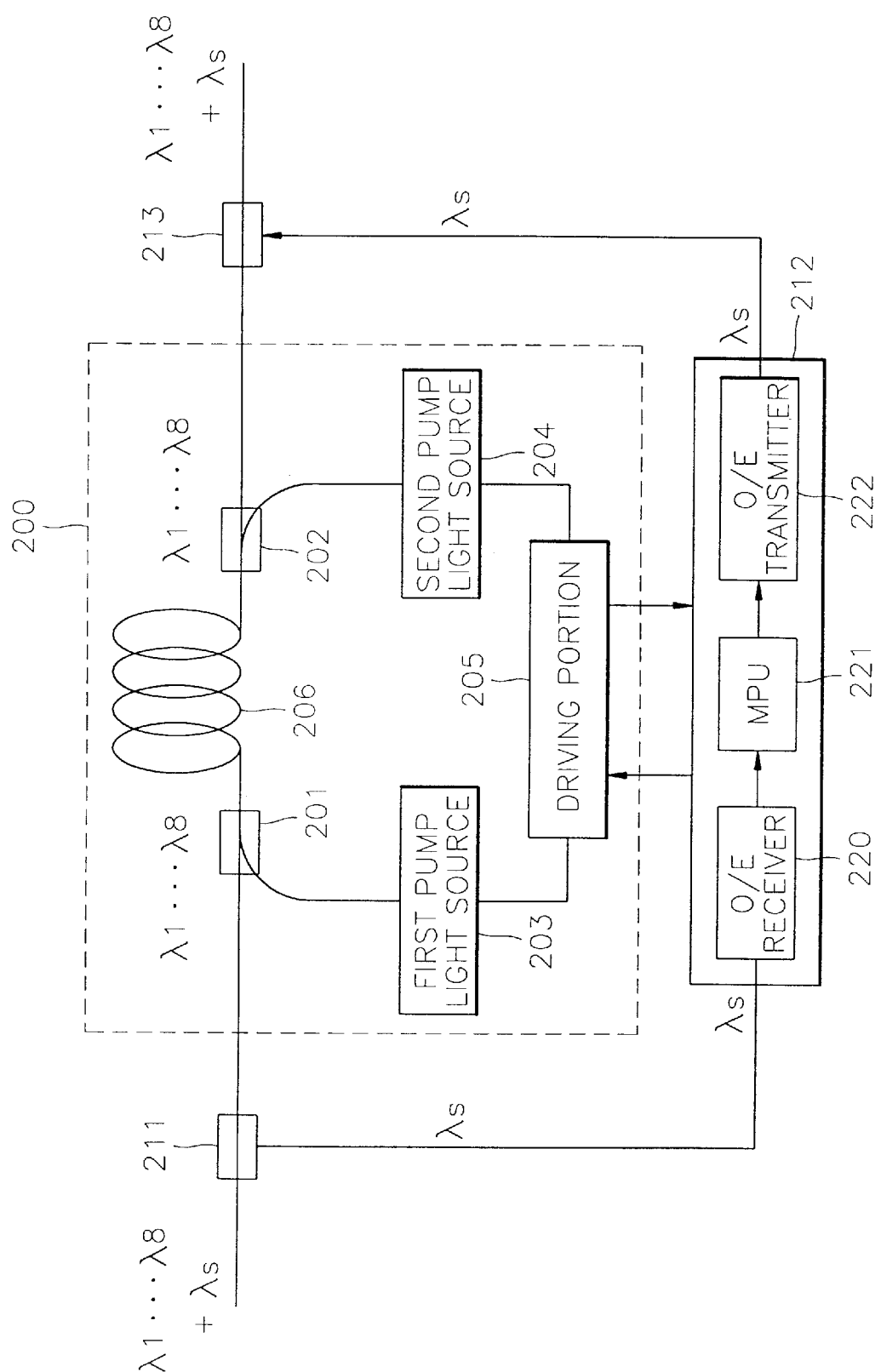
FIG. 2 shows the structure of a wavelength division multiplexed erbium doped fiber amplifier (WDM-EDFA) of FIG. 1.

The respective WDM-EDFAs 108, 110, and 120 each includes an amplifying portion 200, a first wavelength selective coupler (WSC) 211, an amplification controlling portion 212, and a second WSC 213, as shown in FIG. 2.

The amplifying portion 200 amplifies the data channels according to the gain controlled through the amplification controller 212 and is comprised of a third WSC 201, a fourth WSC 202, a first pumping light source 203 such as a laser diode, a second pumping light source 204, a driving portion 205 for driving the first and second pumping light sources 203 and 204, and an erbium doped optical fiber (EDF) 206.

The third WSC 201 couples the data channels with the pumping light of the first pumping light source 203 and outputs the result to the EDF 206. The pumping light of the second pumping light source 204 coupled through the fourth WSC 202 also excites the erbium ion included in the EDF 206. The driving portion 205 controls the amplification gain of the EDF 206 by controlling the current of the first and second pumping light sources 203 and 204 according to the amplification gain information input from the amplification controller 212.

The first WSC 211 separates the supervision channel from the signal light input to the WDM-EDFA. The amplification controller 212 converts the separated supervision channel into an electrical signal. Also, the amplification controller 212 drives the first and second pumping light sources 203 and 204 and constructs the state information of the amplifying portion 200 by supervision channel data and converts the supervision channel data into an optical signal. The second WSC 213 outputs the supervision channel converted into an optical signal by the amplification controller 212 to the transmission line. The amplification controller 212 is comprised of a photoelectric conversion (O/E) receiver 220, a microprocessing unit (MPU) 221, an electro-optic (E/O) transmitter 222.

Figure 3:
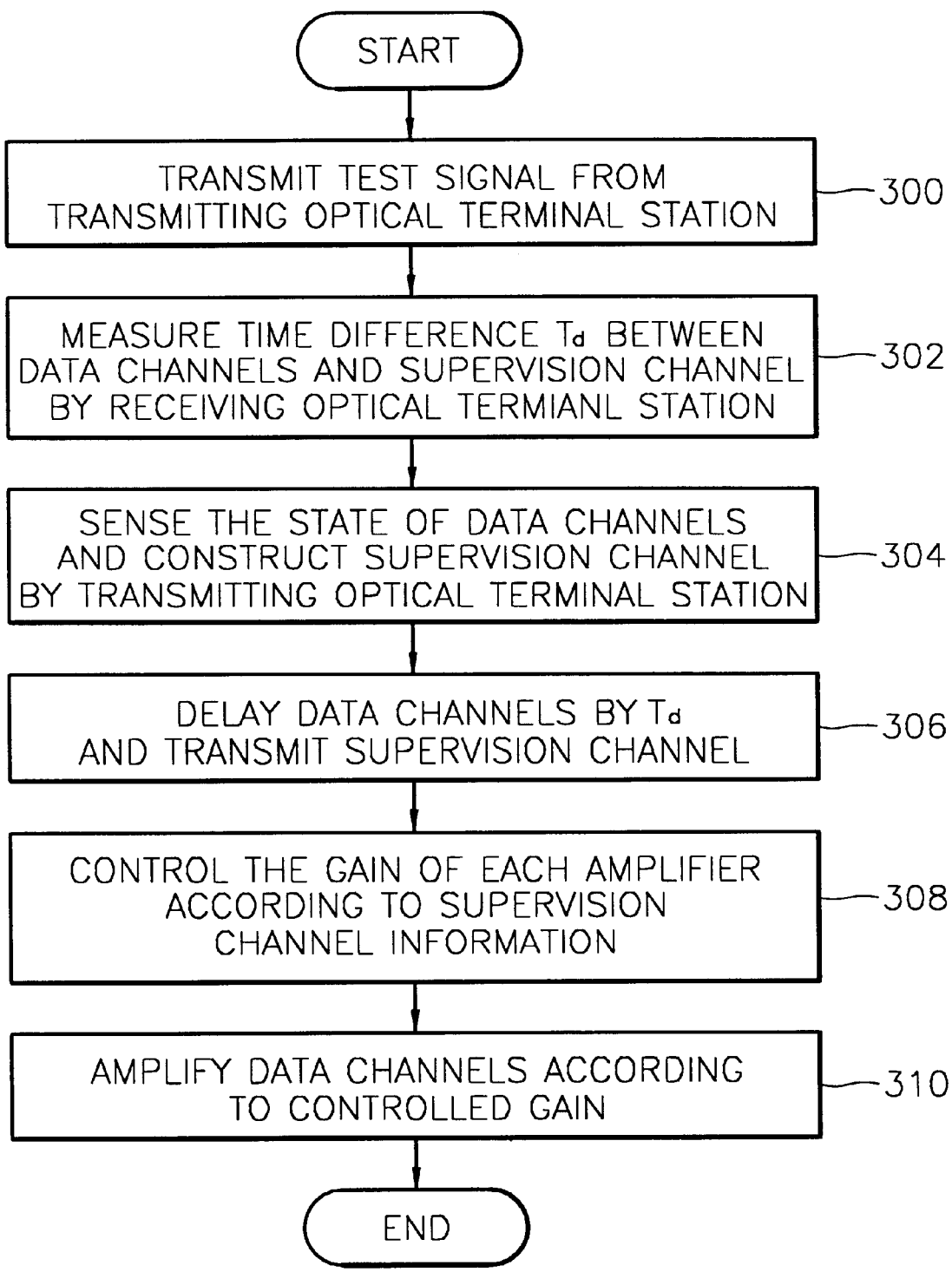
FIG. 3 is a flowchart of a wavelength division multiplexed transmitting method according to the present invention.

The operation of the present invention will be described with reference to the flowchart of FIG. 3. A test signal comprised of the data channels and the supervision channel is transmitted from the transmitting optical terminal station 100 (step 300). A total time difference $T_d$ between the data channels and the supervision channel is measured by the receiving optical terminal station 130. Namely, since it takes some time to process the supervision channel by the amplification controller 212 when the supervision channel passes through the respective WDM-EDFAs 110 and 120 on the transmission line, there is a difference between time taken for the supervision channel to reach the receiving optical terminal station 130 and time taken for the data channels to reach the receiving optical terminal station 130. For example, the time difference $T_d$ in the case of using the same WDM-EDFAs is determined by $T_k x$, wherein x is equal to the number of the WDM-EDFAs on the transmission line. At this time x=1, thus $T_k$ is the delay time of one WDM-EDFA. The receiving optical terminal station 130 measures the time difference and transmits it to the transmitting optical terminal station 100 (step 302). The transmitting optical terminal station 100 sets the data channel delaying portion 104, delays the data channels by the time difference $T_d$, and transmits the delayed data channels (step 306). When an optical communications service starts, the transmitting optical terminal station 100 senses a change in the state of the data channels due to add and drop of the data channels generated due to the request of a user, the appropriate distribution of channels, and misoperation of equipment. Then, the transmitting optical terminal station 100 constructs the supervision channel data by a predetermined protocol so as to control the amplification gain of the respective WDM-EDFAs 110 and 120 (step 304). The constructed supervision channel data is converted into an optical signal through the supervision channel converter 106 and is output through the transmission WDM-EDFA 108 through the MUX 107 (step 306). The transmission WDM-EDFA 108 amplifies the data channels according to the amplification gain included in the supervision channel information and transmits the channel information thereof, loaded in the supervision channel. The supervision channel controls the amplification gain of the respective WDM-EDFAs 110 and 120, passing through the respective WDM-EDFAs 110 and 120 (step 308).

The amplification gain of the respective WDM-EDFAs 108, 110, and 120 is controlled as follows. First, the supervision channel is separated from the data channels through the first WSC 211 and is converted into an electric signal through the O/E receiver 220. The MPU 221 analyses the supervision channel data and gives the add and drop information of the respective channels and the driving current values of the first and second pumping light sources 203 and 204 to the driving portion 205 of the amplifying portion 200. Also, the receiving optical terminal station 130 receives the current and temperature values of the first and second pumping light sources 203 and 204 from the driving portion 205 to determine the amplification state of the concerned WDM-EDFA (such as WDM-EDFA 120 in FIG. 1) and constructs the supervision channel data again. The supervision channel data is converted into an optical signal through the E/O transmitter 222 and is output to the transmission line through the second WSC 213.

The data channels are delayed a time $T_d$ through the data channel delaying portion 104 and is converted into the optical signal through the data channel converter 105. The converted signal is transmitted after being multiplexed through the MUX 107 and amplified through the transmission WDM-EDFA 108.

Figure 4:
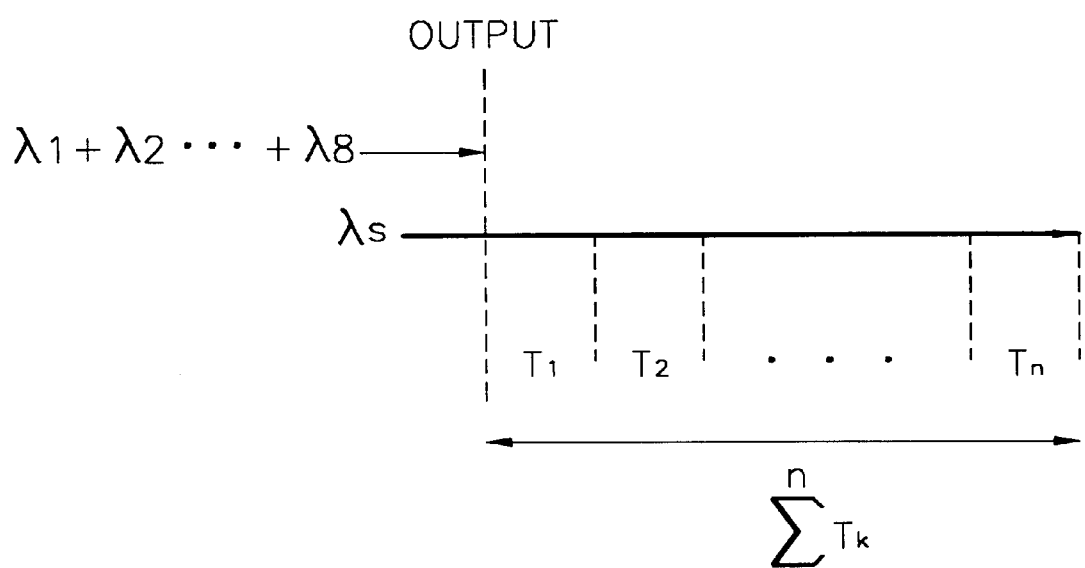
FIG. 4 shows a point in time at which a data channel is transmitted after a delay of time.

FIG. 4 shows a point in time of the data channels after the delay of time. The transmitted data channel optical signal is amplified by the EDF 206 according to the pumping light output by the respective WDM-EDFAs 110 and 120 on the transmission lines, corresponding to the amplification gain of the supervision channel data (step 310). The amplified data channel optical signal is transmitted to the transmission line through the second WSC 213. Since such processes are continuously performed, the WDM-EDFA performs optical amplification in a state in which the gain control is completed before the data channels are input.

According to the present invention, it is possible to prevent loss of data due to an imbalance in the gain during optical transmission processes since the optical amplification is performed in a state in which the gain control is completed before the data channels are input by letting the data channels corresponding to the current supervision channel continuously perform a delay by a certain time which can be set before starting a service. Also, gain flattening is more successfully maintained in a long distance transmission since it is possible to perform certain gain control in the respective channels which are the most important in the WDM-EDFA and to minimize the change of gain in each wavelength according to the change of the state of a channel.

What is claimed is:

1. A wavelength division multiplexed optical transmission system, comprising:

a transmitting optical terminal station for transmitting a supervision channel, delaying a plurality of data channels by a determined time, converting the plurality of delayed data channels into a plurality of optical signals, and transmitting the plurality of optical signals;

a plurality of wavelength division multiplexed optical amplifying portions for controlling amplification gain according to gain information included in the supervision channel and amplifying the plurality of optical signals according to the controlled amplification gain; and a receiving optical terminal station for receiving the supervision channel and the optical signals output from one of said plurality of wavelength division multiplexed optical amplifying portions, said receiving optical terminal station controlling the delaying of said plurality of data channels by said determined time in said transmitting optical terminal station.

2. The wavelength division multiplexed optical transmission system of claim 1, wherein the transmitting optical terminal station comprises:

a channel processor for separating the data channels from the supervision channel and generating said supervision channel in response to data channel state information including information with respect to adding and dropping of the data channels and information including the amplification gain of the wavelength division multiplexed optical amplifying portion;

a data channel delaying portion for delaying the data channels separated from the channel processing portion for said determined time;

a data channel converter for converting the delayed data channels into said plurality of optical signals;

a supervision channel converter for converting the supervision channel generated by the channel processing portion into supervisory optical signal;

a multiplexer for multiplexing the plurality of optical signals and the supervisory optical signal; and a transmission wavelength division multiplexed optical amplifying portion for amplifying the plurality of optical signals according to the amplification gain included in the supervisory optical signal and transmitting amplified optical signals and said supervisory optical signal as a signal light.

3. The wavelength division multiplexed optical transmission system of claim 2, wherein each of said plurality of wavelength division multiplexed optical amplifying portions comprises:

a first wavelength selective coupler for receiving said signal light and separating said supervisory optical signal from said plurality of optical signals;

an amplifying portion for amplifying the plurality of optical signals output from the first wavelength selective coupler according to a control value;

an amplification controller for converting the supervisory optical signal output from the first wavelength selective coupler into an electrical signal, outputting the control value to the amplifying portion according to the add and drop information of the data channels included in data of the supervision channel, receiving data with respect to an amplification state of the amplifying portion, constructing the supervision channel data, and converting the supervision channel data into an optical signal; and a second wavelength selective coupler for combining the output of the amplifying portion with the output of the amplification controller.

4. The wavelength division multiplexed optical transfer system of claim 3, wherein the amplifying portion comprises:

first and second pumping light sources;

a third wavelength selective coupler for coupling pumping light generated by the first pumping light source with the plurality of optical signals which passed through the first wavelength selective coupler;

an erbium doped optical fiber for amplifying the plurality of optical signals according to pumping light which passed through the third wavelength selective coupler and pumping light generated by the second pumping light source;

a fourth wavelength selective coupler for transmitting said pumping light generated by said second pumping light source to the erbium doped optical fiber and transferring the plurality of optical signals amplified by the erbium doped optical fiber to the second wavelength selective coupler; and a driving portion for driving the first and second pumping light sources according to the control value input from the amplification controller and outputting state information of the first and second pumping light sources to the amplification controller.

5. The wavelength division multiplexed optical transmission system of claim 3, wherein the amplification controller comprises:

a photoelectric conversion receiver for converting said supervisory optical signal separated by the first wavelength selective coupler into an electric signal;

a microprocessor for outputting the control value from the supervision channel data of the converted electric signal to the amplifying portion and adding information having the amplification state of the amplifying portion to the supervision channel data; and an electro-optic signal transmitting portion for converting the added supervision channel data into a new supervisory optical signal and transmitting the new supervisory optical signal to the second wavelength selective coupler.

6. A method for multiplexing and transmitting a plurality of data channel optical signals and a supervision channel optical signal using transmitting and receiving optical terminal stations and a wavelength division multiplexed optical amplifying portion positioned on a transmission line between the transmitting and receiving optical terminal stations, comprising the steps of:

measuring a time difference between data channels and a supervision channel using a predetermined test signal;

constructing a supervision channel by sensing a change in the respective data channels, determining the gain of the wavelength division multiplexed amplifying portion by the transmitting terminal station, and transmitting the supervision channel;

controlling the gain of the wavelength division multiplexed amplifying portion according to the amplification gain information included in the supervision channel;

delaying the data channels by the time difference by the transmitting optical terminal station and transmitting the delayed data channels to the wavelength division multiplexed optical amplifying portion; and amplifying and transmitting the data channels according to the gain controlled by the wavelength division multiplexed amplifying portion.

7. The method as set forth in claim 6, wherein said measuring step is performed by said receiving optical terminal station and said time difference is transmitted by said receiving optical terminal station to said transmitting optical terminal station.

8. A wavelength division multiplexed optical transmission system, comprising:

a transmitting optical terminal station for transmitting a supervision channel as a supervisory optical signal, delaying a plurality of data channels by a determined time, converting the plurality of delayed data channels into a plurality of optical signals, and transmitting the plurality of optical signals;

a plurality of wavelength division multiplexed optical amplifying portions for controlling amplification gain according to gain information included in the supervisory optical signal and amplifying the plurality of optical signals according to the controlled amplification gain; and a receiving optical terminal station for receiving the supervisory optical signal and the optical signals output from one of said plurality of wavelength division multiplexed optical amplifying portions, said receiving optical terminal station transmits said determined time to said transmitting optical terminal station.

9. The wavelength division multiplexed optical transmission system of claim 8, wherein the transmitting optical terminal station comprises:

a channel processor for separating the data channels from a supervision channel and generating said supervision channel in response to data channel state information including information with respect to adding and dropping of the data channels and information including the amplification gain of the wavelength division multiplexed optical amplifying portion;

a data channel delaying portion for delaying the data channels separated from the channel processing portion for said determined time;

a data channel converter for converting the delayed data channels into said plurality of optical signals;

a supervision channel converter for converting the supervision channel generated by the channel processing portion into supervisory optical signal;

a multiplexer for multiplexing the plurality of optical signals and the supervisory optical signal; and a transmission wavelength division multiplexed optical amplifying portion for amplifying the plurality of optical signals according to the amplification gain included in the supervisory optical signal and transmitting amplified optical signals and said supervisory optical signal as a signal light.

10. The wavelength division multiplexed optical transmission system of claim 9, wherein each of said plurality of wavelength division multiplexed optical amplifying portions comprises:

a first wavelength selective coupler for receiving said signal light and separating said supervisory optical signal from said plurality of optical signals;

an amplifying portion for amplifying the plurality of optical signals output from the first wavelength selective coupler according to a control value;

an amplification controller for converting the supervisory optical signal output from the first wavelength selective coupler into an electrical signal, outputting the control value to the amplifying portion according to the add and drop information of the data channels included in data of the supervision channel, receiving data with respect to an amplification state of the amplifying portion, constructing the supervision channel data, and converting the supervision channel data into an optical signal; and a second wavelength selective coupler for combining the output of the amplifying portion with the output of the amplification controller.

11. The wavelength division multiplexed optical transfer system of claim 10, wherein the amplifying portion comprises:

first and second pumping light sources;

a third wavelength selective coupler for coupling pumping light generated by the first pumping light source with the plurality of optical signals which passed through the first wavelength selective coupler;

an erbium doped optical fiber for amplifying the plurality of optical signals according to pumping light which passed through the third wavelength selective coupler and pumping light generated by the second pumping light source;

a fourth wavelength selective coupler for transmitting said pumping light generated by said second pumping light source to the erbium doped optical fiber and transferring the plurality of optical signals amplified by the erbium doped optical fiber to the second wavelength selective coupler; and a driving portion for driving the first and second pumping light sources according to the control value input from the amplification controller and outputting state information of the first and second pumping light sources to the amplification controller.

12. The wavelength division multiplexed optical transmission system of claim 10, wherein the amplification controller comprises:

a photoelectric conversion receiver for converting said supervisory optical signal separated by the first wavelength selective coupler into an electric signal;

a microprocessor for outputting the control value from the supervision channel data of the converted electric signal to the amplifying portion and adding information having the amplification state of the amplifying portion to the supervision channel data; and an electro-optic signal transmitting portion for converting the added supervision channel data into a new supervisory optical signal and transmitting the new supervisory optical signal to the second wavelength selective coupler.

13. The wavelength division multiplexed optical transmission system of claim 8, wherein the receiving optical terminal station measures a total time difference between the data channels and the supervision channel in response to a test signal transmitted from the transmitting optical terminal station, wherein said test signal comprises the data channels and the supervision channel, and the receiving optical terminal station transmits said total time difference as said determined time to said transmitting optical terminal station.

* * * * *